US012275237B2

(12) United States Patent
Suzuki

(10) Patent No.: US 12,275,237 B2
(45) Date of Patent: Apr. 15, 2025

(54) MEDIUM SUPPORTING MECHANISM AND PRINTING APPARATUS

(71) Applicant: SEIKO EPSON CORPORATION, Tokyo (JP)

(72) Inventor: Nariyuki Suzuki, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 259 days.

(21) Appl. No.: 18/164,244

(22) Filed: Feb. 3, 2023

(65) Prior Publication Data

US 2023/0294423 A1 Sep. 21, 2023

(30) Foreign Application Priority Data

Feb. 4, 2022 (JP) ................................ 2022-016191

(51) Int. Cl.
*B41J 11/00* (2006.01)
*B41J 11/02* (2006.01)
(Continued)

(52) U.S. Cl.
CPC ............ *B41J 11/0045* (2013.01); *B41J 11/02* (2013.01); *B41J 11/06* (2013.01); *B41J 15/046* (2013.01);
(Continued)

(58) Field of Classification Search
CPC ......... B41J 11/02; B41J 11/06; B41J 11/0025; B41J 11/0055
See application file for complete search history.

(56) References Cited

U.S. PATENT DOCUMENTS 9,028,160 B2 * 5/2015 Garcia ..................... B41J 15/04 101/474
2016/0089904 A1 * 3/2016 Kitagishi .................. B41J 2/01 347/104

(Continued)

FOREIGN PATENT DOCUMENTS

JP 2019-111702 A 7/2019

*Primary Examiner* — Henok D Legesse
(74) *Attorney, Agent, or Firm* — WORKMAN NYDEGGER

(57) ABSTRACT

A medium support portion includes a support face configured to support a medium transported in a transport direction, and a guide groove extending along a width direction at the support face. The guide groove includes a first surface and a second surface. The first surface and the second surface constitute inner walls of the guide groove that extends in the width direction, and are opposed to each other in the transport direction. The medium support portion includes a holding unit configured to hold an end portion of the medium in the width direction, and also includes a contact portion. The contact portion is able to move between a contacting position where the contact portion is in contact with the first surface and the second surface in a state of pressing the first surface and the second surface and a separating position where the contact portion is in contact with the second surface and is spaced apart from the first surface. An operation portion is able to move in a direction from either the first surface or the second surface toward the other surface relative to the holding unit. The contact portion moves from the contacting position to the separating position in association with movement of the operation portion in a direction from the first surface toward the second surface.

7 Claims, 5 Drawing Sheets

(51) Int. Cl.
*B41J 11/06* (2006.01)
*B41J 15/04* (2006.01)

(52) U.S. Cl.
CPC ......... *B41J 11/0025* (2013.01); *B41J 11/0055* (2013.01)

(56) References Cited

U.S. PATENT DOCUMENTS

| | | | | |
|---|---|---|---|---|
| 2019/0193435 | A1* | 6/2019 | Washizawa | B41J 11/0025 |
| 2020/0102174 | A1* | 4/2020 | Uchibori | B65H 31/02 |
| 2021/0268816 | A1* | 9/2021 | Washizawa | B41J 2/16517 |

* cited by examiner

MEDIUM SUPPORTING MECHANISM AND PRINTING APPARATUS

The present application is based on, and claims priority from JP Application Serial Number 2022-016191, filed on Feb. 4, 2022, the disclosure of which is hereby incorporated by reference herein in its entirety.

BACKGROUND

1. Technical Field

The present disclosure relates to a medium supporting mechanism configured to support a medium transported in a transport direction and hold an end portion, in a width direction, of the supported medium, and also relates to a printing apparatus.

2. Related Art

For example, JP-A-2019-111702 discloses a medium supporting mechanism and a printing apparatus, which include a medium support portion including a support face configured to support a medium transported in a transport direction, and a medium holding unit configured to hold an end portion, in a width direction, of a medium supported by a support face. In such a medium supporting mechanism, a medium holding unit engages with two guide rails provided at the support face to fix the medium holding unit to the support face.

Specifically, a first engaging portion configured to be able to engage with a first guide rail is provided at one end portion of the medium holding unit in the longitudinal direction, and a second engaging portion configured to be able to engage with a second guide rail is provided at the other end portion of the medium holding unit in the longitudinal direction. In addition, an operation portion configured such that a user is able to operate is provided at the other end portion of the medium holding unit in the longitudinal direction. As the operation portion is operated, the second engaging portion moves in a direction away from the first engaging portion, which increases the distance between the first engaging portion and the second engaging portion. In this manner, at least by making the first engaging portion spaced apart from an inner wall of the first guide rail or by making the second engaging portion spaced apart from an inner wall of the second guide rail, it is possible to move the medium holding unit in the width direction relative to the support face.

However, in a case of the medium supporting mechanism and the printing apparatus described above, when the medium holding unit is moved in the width direction in response to the operation performed to the operation portion, a frictional force occurs between the medium holding unit and the support face, which, in some cases, makes the medium holding unit tilted from a direction along the transport direction. In such a case, the position of the medium holding unit needs to be adjusted such that the medium holding unit is disposed in a direction along the transport direction. Thus, it is desired to improve the operability in terms of movement of the medium holding unit in the width direction.

SUMMARY

A medium supporting mechanism used to solve the problem described above includes a medium support portion configured to support a medium transported in a transport direction, and a medium holding unit configured to hold an end portion, in a width direction, of the medium supported by the medium support portion, when the width direction represents a direction intersecting the transport direction, in which the medium support portion includes a support face configured to support the medium transported in the transport direction, a guide groove extending along the width direction at the support face, and an engaged portion disposed upstream of the guide groove in the transport direction and intersecting the support face, the guide groove includes a first surface and a second surface, the first surface and the second surface constitute inner walls of the guide groove that extends in the width direction, and are opposed to each other in the transport direction, the medium holding unit includes a holding unit configured to hold the end portion, an engaging portion configured to engage with the engaged portion, a contact portion configured to move between a contacting position where the contact portion is in contact with the first surface and the second surface in a state of pressing the first surface and the second surface and a separating position where the contact portion is in contact with the second surface and is spaced apart from the first surface, and an operation portion configured to, when operated by a user, move in a direction from one of the first surface and the second surface toward the other surface relative to the holding unit, and the contact portion moves from the contacting position to the separating position in association with movement of the operation portion in a direction from the first surface toward the second surface.

A printing apparatus used to solve the problem described above includes a medium support portion configured to support a medium transported in a transport direction, a medium holding unit configured to hold an end portion, in a width direction, of the medium supported by the medium support portion, when the width direction represents a direction intersecting the transport direction, and a printing unit configured to perform printing on the medium supported by the medium support portion, in which the medium support portion includes a support face configured to support the medium transported in the transport direction, a guide groove extending along the width direction at the support face, and an engaged portion disposed upstream of the guide groove in the transport direction and intersecting the support face, the guide groove includes a first surface and a second surface, the first surface and the second surface constitute inner walls of the guide groove that extends in the width direction, and are opposed to each other in the transport direction, the medium holding unit includes a holding unit configured to hold the end portion, an engaging portion configured to engage with the engaged portion, a contact portion configured to move between a contacting position where the contact portion is in contact with the first surface and the second surface in a state of pressing the first surface and the second surface and a separating position where the contact portion is in contact with the second surface and is spaced apart from the first surface, and an operation portion configured to, when operated by a user, move in a direction from one of the first surface and the second surface toward the other surface relative to the holding unit, and the contact portion moves from the contacting position to the separating position in association with movement of the operation portion in a direction from the first surface toward the second surface.

DESCRIPTION OF EXEMPLARY EMBODIMENTS

First Embodiment

Below, an embodiment of a printing apparatus including a medium supporting mechanism will be described with reference to the drawings. In the following description, a width direction X represents a short-length direction of a medium M, and a transport direction Y represents a direction in which the medium M is transported at a position where a printing unit 13 performs printing. The transport direction Y is also a longitudinal direction of the medium M. In the present embodiment, the width direction X and the transport direction Y are directions intersecting each other (for example, at a right angle), and both of them are directions intersecting the vertical direction Z (for example, at a right angle).

Configuration of Printing Apparatus 10

Figure 1:
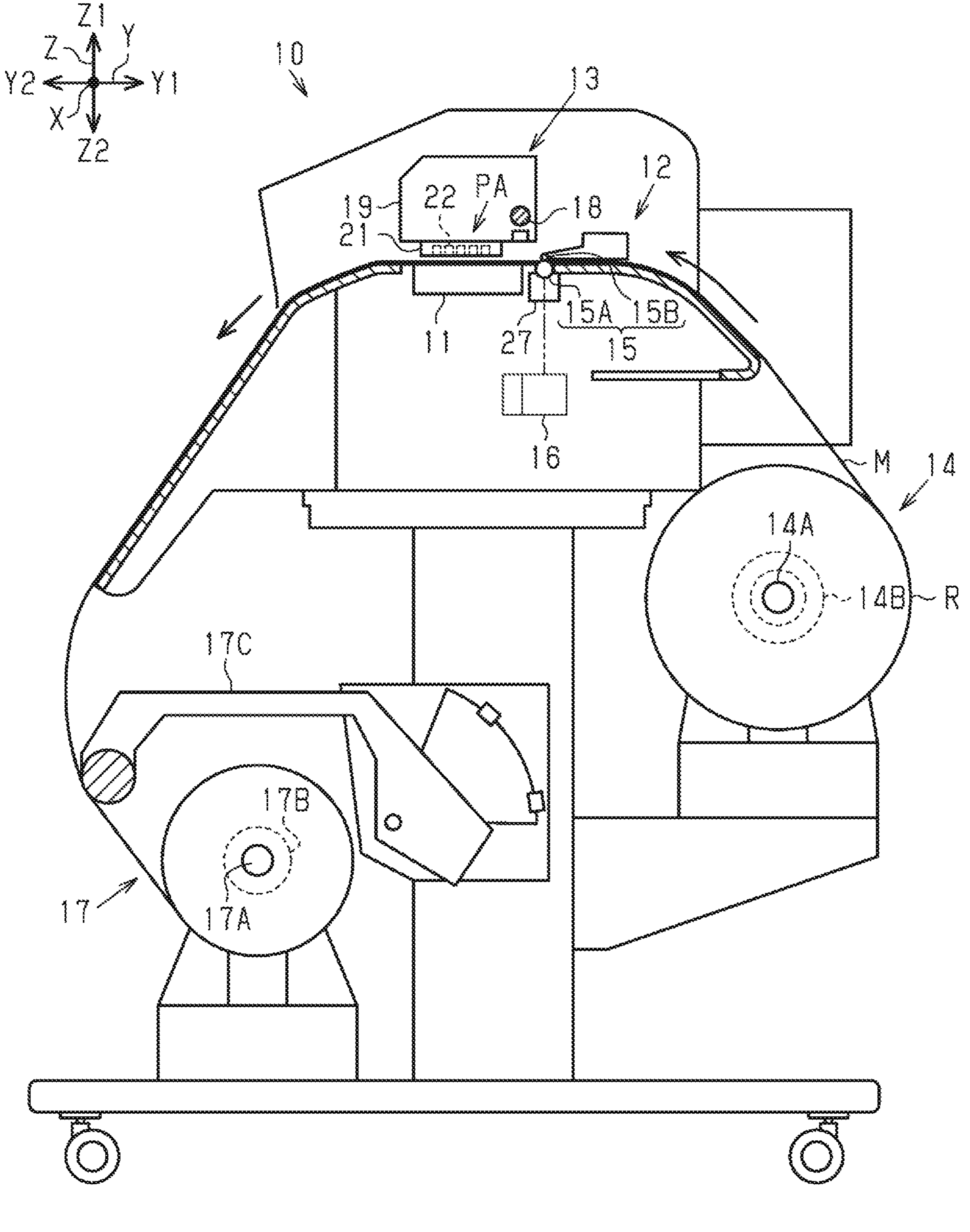
FIG. 1 is a cross-sectional view schematically illustrating a printing apparatus.

As illustrated in FIG. 1, the printing apparatus 10 may be, for example, a large format printer. The large format printer performs printing on a long medium M having a large format size. The printing apparatus 10 may be an inkjet printer of a serial printing type.

The printing apparatus 10 includes a medium supporting mechanism 11, a transport unit 12, and a printing unit 13. The medium supporting mechanism 11 is configured to support the medium M. The transport unit 12 is configured to transport the medium M in the transport direction Y. The printing unit 13 is configured to perform printing on the medium M supported by the medium supporting mechanism 11.

The medium supporting mechanism 11 supports the medium M transported by the transport unit 12. In particular, in a printing region PA where printing is performed by the printing unit 13, the medium supporting mechanism 11 supports the medium M transported by the transport unit 12.

The printing apparatus 10 includes a feeding unit 14. The feeding unit 14 feeds the medium M. The feeding unit 14 includes a support shaft 14A and a feeding motor 14B. The support shaft 14A rotatably supports a roll body R in which the medium M is wound in a roll form. The feeding motor 14B serves as a power source configured to cause the support shaft 14A to rotate. As the support shaft 14A rotates with drive of the feeding motor 14B, the feeding unit 14 delivers the long medium M from the roll body R.

The transport unit 12 transports the fed medium M in the transport direction Y. The transport unit 12 includes a transport roller pair 15 and a transport motor 16. The transport roller pair 15 is provided upstream Y1 of the printing unit 13 in the transport direction Y. The transport roller pair 15 includes a transport driving roller 15A and a transport driven roller 15B. The transport driving roller 15A is able to rotate with drive of the transport motor 16. The transport driven roller 15B follows the rotation of the transport driving roller 15A and rotates. The transport motor 16 serves as a power source of the transport driving roller 15A. As the transport driving roller 15A rotates with drive of the transport motor 16, the transport unit 12 transports, in the transport direction Y, the medium M fed from the feeding unit 14 in a state of being interposed (nipped).

The printing apparatus 10 includes a winding unit 17. The winding unit 17 winds, in a roll form, the medium M after printing. The winding unit 17 includes a winding shaft 17A, a winding motor 17B, and a tension application unit 17C. The winding shaft 17A supports the medium M after printing. The winding motor 17B serves as a driving source of the winding shaft 17A. The tension application unit 17C applies tension to the medium M after printing. As the winding shaft 17A rotates with drive of the winding motor 17B, the winding unit 17 winds the medium M to which tension is applied by the tension application unit 17C.

The printing unit 13 includes a guide shaft 18, a carriage 19, and a liquid discharging head 21. The guide shaft 18 is provided so as to be along the width direction X of the medium M. The carriage 19 is supported by the guide shaft 18. The carriage 19 supports the liquid discharging head 21. With drive of a carriage motor that is not illustrated, the carriage 19 is caused to scan along a direction of the axial line of the guide shaft 18. In other words, the carriage 19 is caused to scan along the width direction X.

The liquid discharging head 21 is provided at a downward side Z2 of the carriage 19 in the vertical direction Z. The liquid discharging head 21 includes a plurality of nozzles 22 configured to discharge a liquid. The plurality of nozzles 22 are opened toward the medium M supported by the medium supporting mechanism 11. The liquid discharging head 21 is configured to discharge a liquid from the plurality of nozzles 22 toward the medium M supported by the medium supporting mechanism 11.

The liquid discharging head 21 is of a serial head type configured to discharge a liquid while the carriage 19 moves in the width direction X. However, the liquid discharging head 21 may be of a line head type. The liquid may be, for example, ink. The color of the liquid may be, for example, one type of color or may include a plurality of types of colors.

In this manner, the printing apparatus 10 alternately performs the transport operation and the printing operation, thereby performing printing on the entire medium M. The transport operation is an operation of transporting the medium M by driving the transport motor 16 for a predetermined period of time. The printing operation is an operation of causing the liquid discharging head 21 to jet a liquid to the medium M supported by the medium supporting mechanism 11 while reciprocating the carriage 19 with driving of a carriage motor, which is not illustrated.

Configuration of Medium Supporting Mechanism 11

Next, the medium supporting mechanism 11 will be described with reference to FIG. 2.

Figure 2:
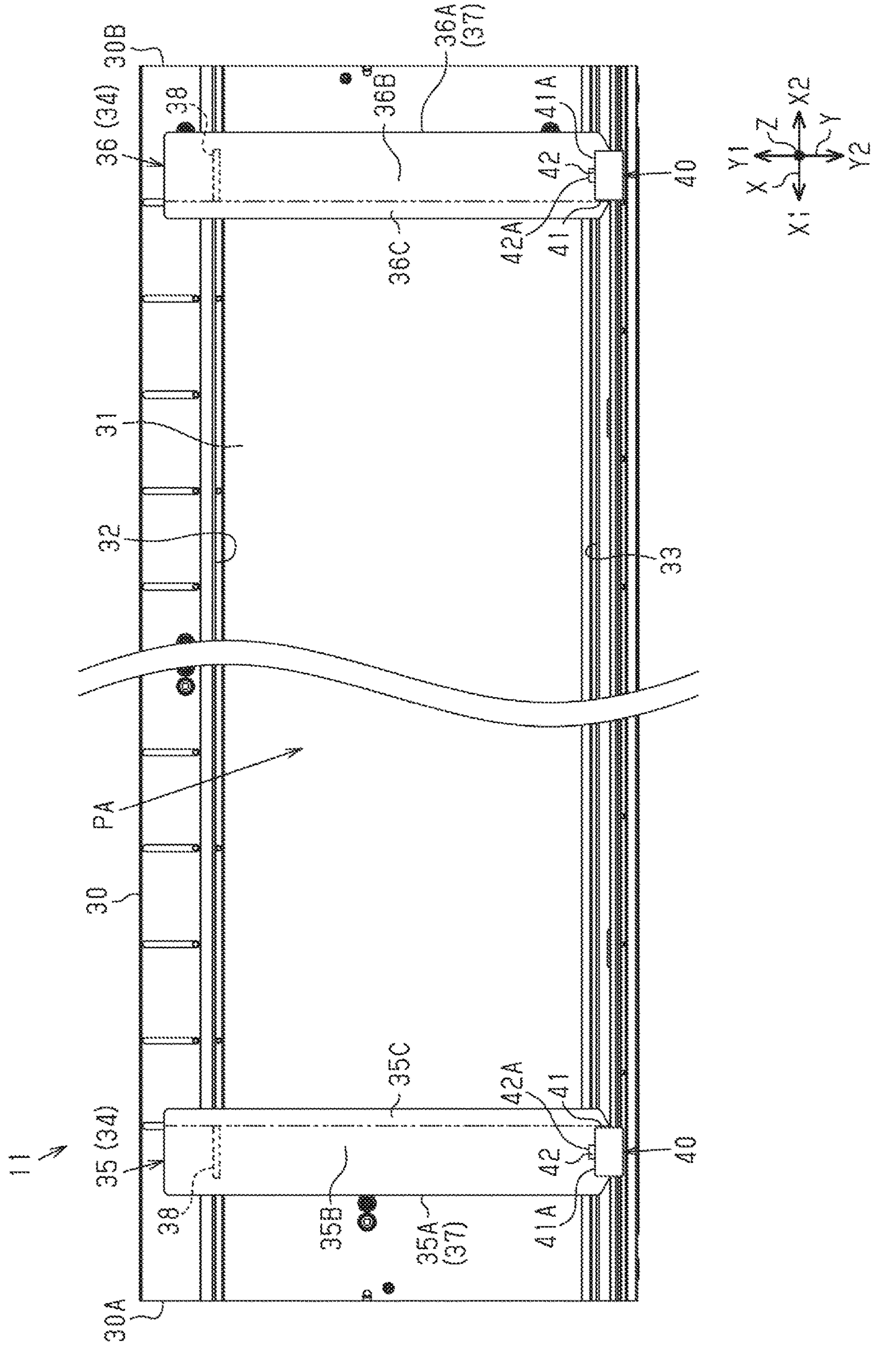
FIG. 2 is a plan view of a medium supporting mechanism.

As illustrated in FIG. 2, the medium supporting mechanism 11 includes a medium support portion 30. The medium support portion 30 is a platen having a flat plate shape. In the medium support portion 30, the longitudinal direction thereof extends in the width direction X, and the the short-length direction thereof extends in the transport direction Y. However, the orientation thereof is not limited to this. The medium support portion 30 includes a first side end surface 30A and a second side end surface 30B.

The medium support portion 30 includes a support face 31. The support face 31 is a surface configured to be able to support the medium M transported in the transport direction Y. The support face 31 includes a printing region PA, and is provided in a region larger than the printing region PA. In this manner, the medium support portion 30 is configured to support the medium M transported in the transport direction Y. The width direction X and the transport direction Y are directions along the support face 31.

The medium support portion 30 includes a first guide rail 32 and a second guide rail 33. The first guide rail 32 has a concave shape recessed from the support face 31. The first guide rail 32 is provided at the support face 31 so as to extend along the width direction X. The first guide rail 32 is provided over the entire medium support portion 30 in the width direction X. In other words, the first guide rail 32 intersects the support face 31, and continues from the first side end surface 30A to the second side end surface 30B. The first guide rail 32 according to the present embodiment corresponds to one example of an engaged portion.

The second guide rail 33 has a concave shape recessed from the support face 31. The second guide rail 33 is provided at the support face 31 so as to extend along the width direction X. The second guide rail 33 is provided over the entire medium support portion 30 in the width direction X. In other words, the second guide rail 33 intersects the support face 31, and continues from the first side end surface 30A to the second side end surface 30B. The second guide rail 33 according to the present embodiment corresponds to one example of a guide groove.

The first guide rail 32 may be provided at a direction opposite from the second guide rail 33 in the transport direction Y with the printing region PA being interposed between them. In other words, the first guide rail 32 may be disposed upstream Y1 of the second guide rail 33 in the transport direction Y.

The medium supporting mechanism 11 includes a medium holding unit 34. The medium holding unit 34 is configured to hold an end portion, in the width direction X, of the medium M supported by the medium support portion 30. The medium holding unit 34 may be an edge holder. The medium holding unit 34 is attached to the medium support portion 30 in a detachable manner. The medium holding unit 34 is formed through blanking or bending of a metal plate.

The medium holding unit 34 includes a first medium holding unit 35 and a second medium holding unit 36. The first medium holding unit 35 and the second medium holding unit 36 are disposed side by side in the width direction X.

The first medium holding unit 35 includes a first holding unit 35A. The first holding unit 35A is a plate member having a rectangular shape. The first holding unit 35A is attached to the medium support portion 30 such that the longitudinal direction thereof extends in the transport direction Y and the short-length direction thereof extends in the width direction X.

The first holding unit 35A includes a first base plate portion 35B and a first medium regulating portion 35C. The first base plate portion 35B is configured such that the longitudinal direction thereof extends in the transport direction Y, and the short-length direction thereof extends in the width direction X. The first base plate portion 35B is in contact with the support face 31.

The first medium regulating portion 35C is configured such that the longitudinal direction thereof extends in the transport direction Y, and the short-length direction thereof extends in the width direction X. The first medium regulating portion 35C is disposed at a second width direction X2 of the first base plate portion 35B. The first holding unit 35A is adjusted in the width direction X to be disposed at a position corresponding to the size of the short-length direction of the medium M. Specifically, the first holding unit 35A is adjusted such that the first medium regulating portion 35C covers one end portion of the medium M.

In this manner, the first medium regulating portion 35C covers one end portion of the medium M from an upward side Z1 in the vertical direction Z. With this configuration, the first medium regulating portion 35C is able to prevent one end portion of the medium M from lifting from the support face 31. That is, the first medium holding unit 35 is configured to hold one end portion, in a first width direction X1, of the medium M supported by the medium support portion 30.

The second medium holding unit 36 includes a second holding unit 36A. The second holding unit 36A is a plate member having a rectangular shape. The second holding unit 36A is attached to the medium support portion 30 such that the longitudinal direction thereof extends in the transport direction Y and the short-length direction thereof extends in the width direction X.

The second holding unit 36A includes a second base plate portion 36B and a second medium regulating portion 36C. The second base plate portion 36B is configured such that the longitudinal direction thereof extends in the transport direction Y, and the short-length direction thereof extends in the width direction X. The second base plate portion 36B is in contact with the support face 31.

The second medium regulating portion 36C is configured such that the longitudinal direction thereof extends in the transport direction Y, and the short-length direction thereof extends in the width direction X. The second medium regulating portion 36C is disposed at the first width direction X1 of the second base plate portion 36B. The second holding unit 36A is adjusted in the width direction X to be disposed at a position corresponding to the size of the short-length direction of the medium M. Specifically, the second holding unit 36A is adjusted such that the second medium regulating portion 36C covers the other end portion of the medium M.

In this manner, the second medium regulating portion 36C covers the other end portion of the medium M from the upward side Z1 in the vertical direction Z. With this configuration, the second medium regulating portion 36C is able to prevent the other end portion of the medium M from lifting from the support face 31. That is, the second medium holding unit 36 is configured to hold the other end portion, in the second width direction X2, of the medium M supported by the medium support portion 30.

Hereinafter, in some cases, description will be made with the first medium holding unit 35 and the second medium holding unit 36 being collectively referred to as the medium holding unit 34. In addition, in some cases, description will be made with the first holding unit 35A and the second holding unit 36A being collectively referred to as a holding unit 37.

In this manner, the medium holding unit 34 includes the holding unit 37. The holding unit 37 is configured to hold the end portion, in the width direction X, of the medium M supported by the medium support portion 30.

The medium holding unit 34 includes an engaging portion 38. The engaging portion 38 is disposed at an end portion of the holding unit 37 at the upstream Y1 side in the transport direction Y. The engaging portion 38 protrudes from the holding unit 37 toward the downward side 22 in the vertical direction Z. The engaging portion 38 may be provided so as to extend in the width direction X. The engaging portion 38 is able to engage with the first guide rail 32. As the engaging portion 38 engages with the first guide rail 32, the holding unit 37 is fixed to the medium support portion 30.

The medium holding unit 34 includes a switching mechanism 40. The switching mechanism 40 is provided at the downstream Y2 side of the holding unit 37 in the transport direction Y. The switching mechanism 40 is a mechanism used to switch whether or not the holding unit 37 is fixed to the medium support portion 30.

The switching mechanism 40 includes a case 41 and an operation portion 42. The case 41 is attached to the holding unit 37. The case 41 accommodates at least a portion of members that constitute the switching mechanism 40. The case 41 includes an upstream end surface 41A. The upstream end surface 41A is disposed at the upstream Y1 side in the transport direction Y.

In FIG. 2, the operation portion 42 protrudes from the case 41 toward the upstream Y1 side in the transport direction Y. The operation portion 42 can be operated by a user. The operation portion 42 is able to move relative to the holding unit 37. The operation portion 42 includes an operation surface 42A. The operation surface 42A is disposed upstream Y1 of the operation portion 42 in the transport direction Y.

The operation portion 42 is able to move between a first position and a second position along the transport direction Y. The first position is a position where the operation portion 42 protrudes from the upstream end surface 41A of the case 41 toward the upstream Y1 side in the transport direction Y. In other words, the first position is a position where the upstream end surface 41A of the case 41 and the operation surface 42A of the operation portion 42 are not flush with each other toward the upstream Y1 side in the transport direction Y. The second position is a position where the operation portion 42 does not protrude from the upstream end surface 41A of the case 41 toward the upstream Y1 side in the transport direction Y. In other words, the second position is a position where the upstream end surface 41A of the case 41 and the operation surface 42A of the operation portion 42 are flush with each other toward the upstream Y1 side in the transport direction Y. Thus, the second position is a position differing from the first position.

In a state where the operation portion 42 is not operated by a user, the operation portion 42 is located at the first position. As a pressing operation is performed by a user from the upstream Y1 side in the transport direction Y, the operation portion 42 moves to the downstream Y2 side in the transport direction Y, and is located at the second position.

When the operation portion 42 is located at the first position, the medium holding unit 34 turns into a first state. The first state is a state in which the holding unit 37 is fixed to the medium support portion 30 with the switching mechanism 40. In other words, the first state is a state in which movement of the holding unit 37 relative to the width direction X along the first guide rail 32 and the second guide rail 33 is restricted.

When the operation portion 42 moves from the first position to the second position in response to operation by the user, the medium holding unit 34 turns into a second state. The second state is a state in which the holding unit 37 is not fixed to the medium support portion 30 with the switching mechanism 40.

When the holding unit 37 moves to the downstream Y2 side in the transport direction Y after the operation portion 42 moves from the first position to the second position in response to the operation by the user, the medium holding unit 34 turns into a third state. The third state is a state in which the holding unit 37 is not fixed to the medium support portion 30, and the holding unit 37 is able to move in the width direction X along the first guide rail 32 and the second guide rail 33.

Configurations of Medium Support Portion 30 and Medium Holding Unit 34

Figure 3:
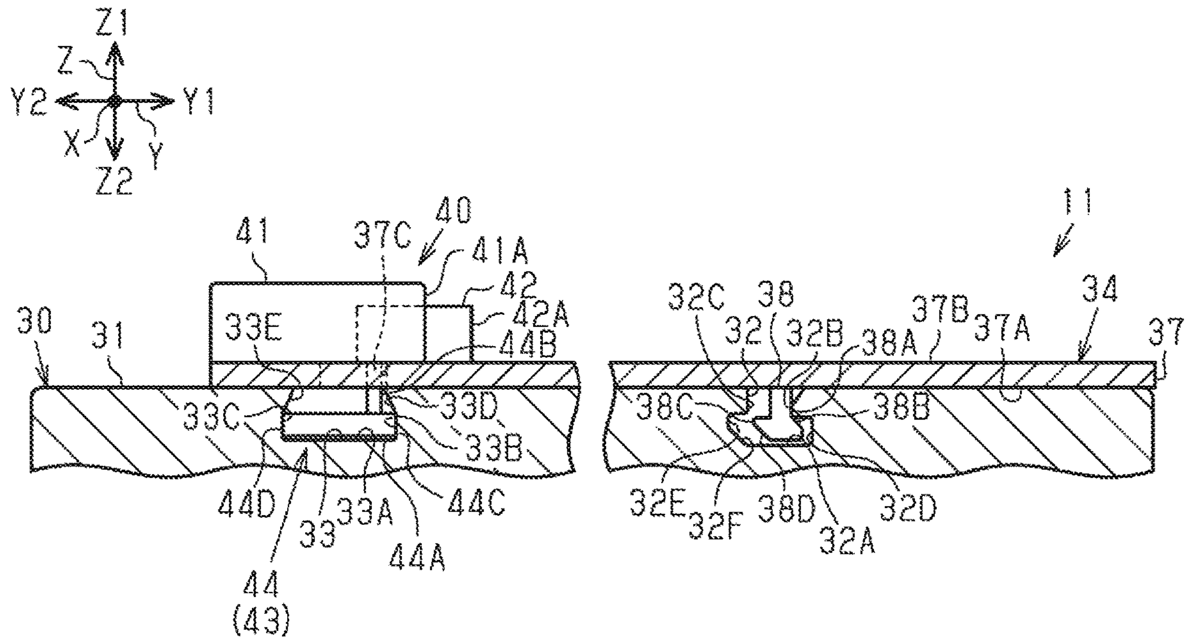
FIG. 3 is a side view illustrating a medium support portion and a medium holding unit in a first state.
Figure 4:
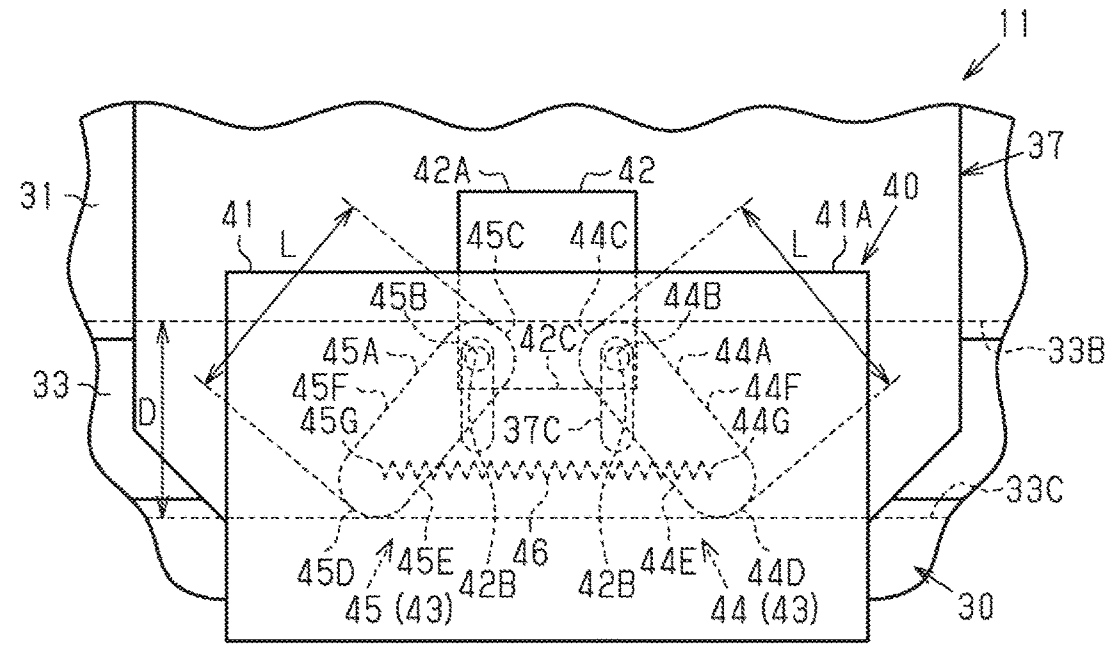
FIG. 4 is a top view illustrating the medium support portion and the medium holding unit in the first state.
Figure 5:
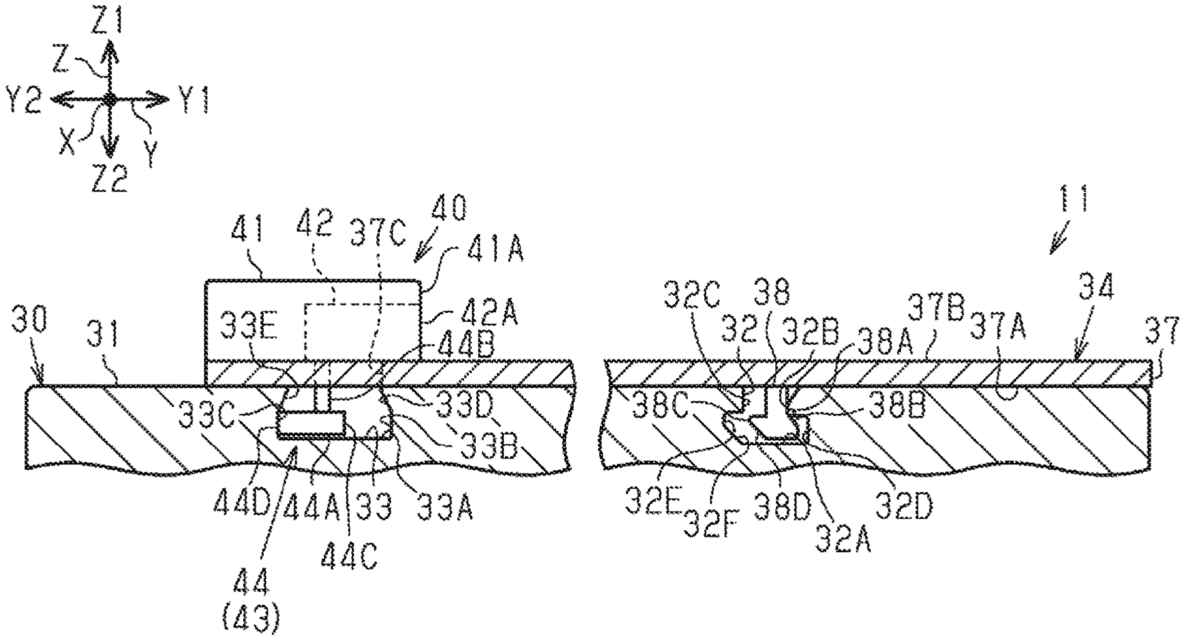
FIG. 5 is a side view illustrating the medium support portion and the medium holding unit in a second state.
Figure 6:
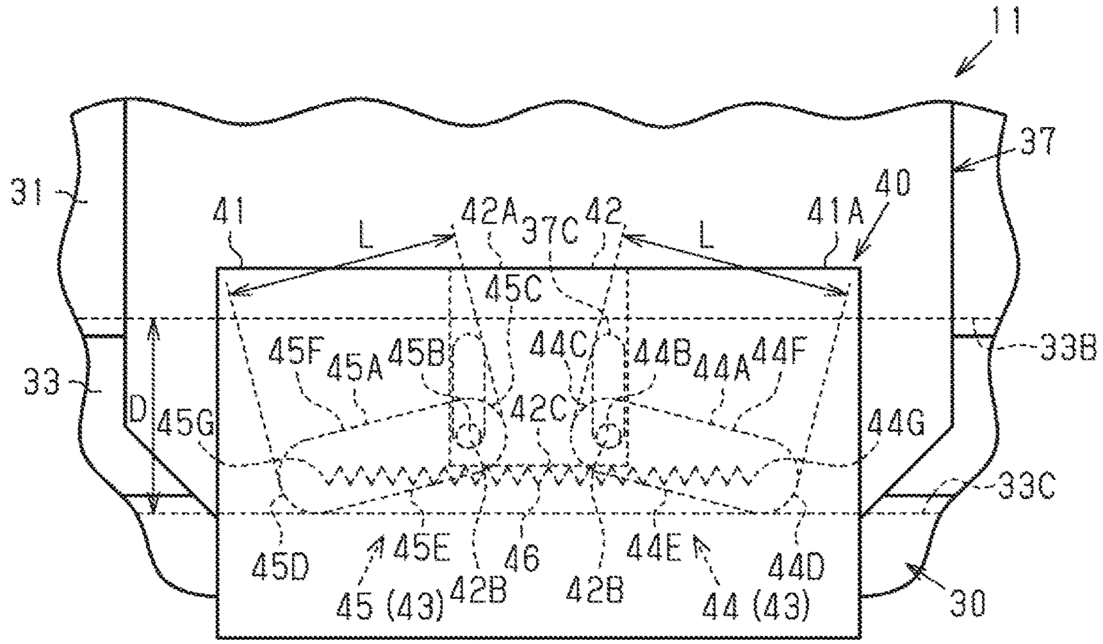
FIG. 6 is a top view illustrating the medium support portion and the medium holding unit in the second state.
Figure 7:
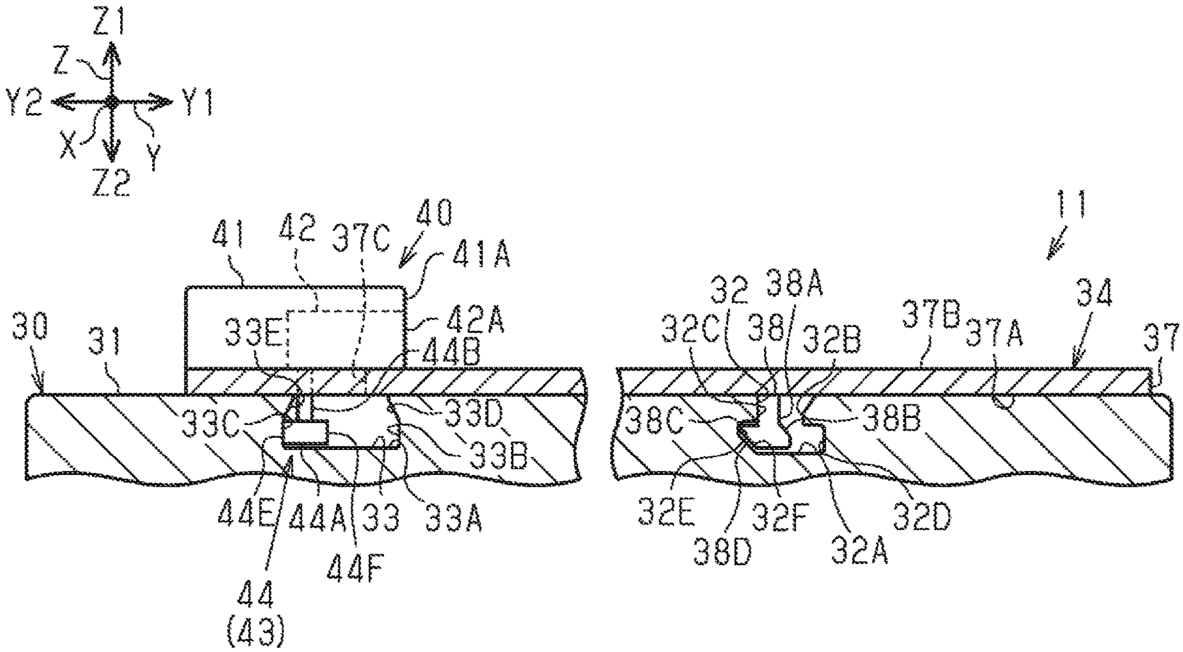
FIG. 7 is a side view illustrating the medium support portion and the medium holding unit in a third state.
Figure 8:
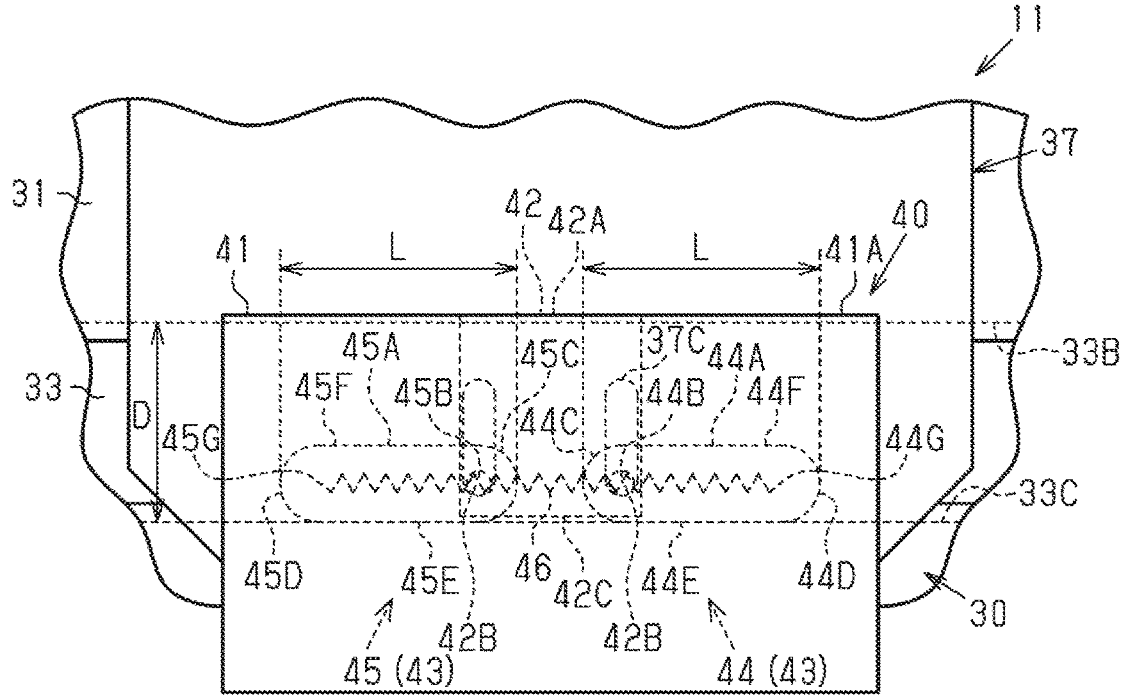
FIG. 8 is a top view illustrating the medium support portion and the medium holding unit in the third state.

Next, the configurations of the medium support portion 30 and the medium holding unit 34 will be described with reference to FIGS. 3 to 8. FIGS. 3, 5, and 7 are side views each illustrating the medium support portion 30 and the medium holding unit 34 as viewed from the side of the end portion thereof in the first width direction X1. FIGS. 4, 6, and 8 are top views each illustrating the medium support portion 30 and the medium holding unit 34 as viewed from the upward side 21 in the vertical direction Z. In addition, FIGS. 3 and 4 are diagrams each illustrating the medium holding unit 34 in the first state. FIGS. 5 and 6 are diagrams each illustrating the medium holding unit 34 in the second state. FIGS. 7 and 8 are diagrams each illustrating the medium holding unit 34 in the third state.

As illustrated in FIG. 3, the first guide rail 32 includes a first bottom surface 32A, a first inner-side surface 32B, and a second inner-side surface 32C. The first inner-side surface 32B is a surface configured to connect the first bottom surface 32A and the support face 31. The second inner-side surface 32C is a surface configured to connect the first bottom surface 32A and the support face 31. The first inner-side surface 32B and the second inner-side surface 32C each constitute the inner wall of the first guide rail 32, and are surfaces that are opposed to each other in the transport direction Y.

The first inner-side surface 32B is a surface disposed at a further side from the second guide rail 33 in the transport direction Y. The second inner-side surface 32C is a surface disposed at a closer side to the second guide rail 33 in the transport direction Y. In other words, the first inner-side surface 32B is a surface disposed upstream Y1 in the transport direction Y. The second inner-side surface 32C is a surface disposed at the downstream Y2 side in the transport direction Y. The first inner-side surface 32B functions as an engaging target surface configured to be able to engage with the engaging portion 38.

In addition, the first guide rail 32 includes a first recessed portion 32D and a second recessed portion 32E. The first recessed portion 32D is a recessed portion recessed from the first inner-side surface 32B to the downstream Y2 side in the transport direction Y. The second recessed portion 32E is a recessed portion recessed from the second inner-side surface 32C to the upstream Y1 side in the transport direction Y. The first guide rail 32 has an inverted letter-T shape when viewed from the side in the width direction X. The second recessed portion 32E includes a guide-side tapered surface 32F. The guide-side tapered surface 32F is sloped toward the upward side Z1 of vertical direction Z as the surface goes toward the upstream Y1 side in the transport direction Y.

The second guide rail 33 includes a second bottom surface 33A, a third inner-side surface 33B, a fourth inner-side surface 33C, a first sloped surface 33D, and a second sloped surface 33E. The third inner-side surface 33B is a surface configured to connect the second bottom surface 33A and the first sloped surface 33D. The fourth inner-side surface 33C is a surface configured to connect the second bottom surface 33A and the second sloped surface 33E. The third inner-side surface 33B and the fourth inner-side surface 33C each constitute the inner wall of the second guide rail 33 that extends in the width direction X, and are surfaces that are opposed to each other in the transport direction Y.

The third inner-side surface 33B is a surface disposed at a closer side to the first guide rail 32 in the transport direction Y. The fourth inner-side surface 33C is a surface disposed at a further side from the first guide rail 32 in the transport direction Y. In other words, the third inner-side surface 33B is a surface disposed upstream Y1 in the transport direction Y. The fourth inner-side surface 33C is a surface disposed at the downstream Y2 side in the transport direction Y. In the present embodiment, the third inner-side surface 33B corresponds to one example of a first surface. In the present embodiment, the fourth inner-side surface 33C corresponds to one example of a second surface. Note that the operation portion 42 described above is able to move, relative to the holding unit 37, in a direction from either one of the third inner-side surface 33B and the fourth inner-side surface 33C toward the other one. At this time, the direction from either one of the third inner-side surface 33B and the fourth inner-side surface 33C toward the other one may be referred to as a movement direction of the operation portion 42. The movement direction includes a first movement direction that is a direction from the third inner-side surface 33B toward the fourth inner-side surface 33C, and a second movement direction that is a direction from the fourth inner-side surface 33C toward the third inner-side surface 33B. That is, the second movement direction is a direction opposite to the first movement direction. In the present embodiment, the first movement direction and the second movement direction are directions along the transport direction Y.

The first sloped surface 33D is a surface configured to connect the third inner-side surface 33B and the support face 31 at the upstream Y1 side of the second guide rail 33 in the transport direction Y. The first sloped surface 33D is a surface sloped from the third inner-side surface 33B toward the downstream Y2 side in the transport direction Y. The second sloped surface 33E is a surface configured to connect the fourth inner-side surface 33C and the support face 31 at the downstream Y2 side of the second guide rail 33 in the transport direction Y. The second sloped surface 33E is a surface sloped from the fourth inner-side surface 33C toward the upstream Y1 side in the transport direction Y. The first sloped surface 33D and the second sloped surface 33E restrict coming-out of the engaging portion 38 from the first guide rail 32 toward the upward side Z1 in the vertical direction Z.

The holding unit 37 includes a lower surface 37A and an upper surface 37B. The lower surface 37A is a surface that is opposed to the medium support portion 30. The upper surface 37B is a surface disposed at a position opposite from the lower surface 37A.

The engaging portion 38 protrudes from the lower surface 37A of the holding unit 37. The engaging portion 38 includes a first base portion 38A, a first protruding piece 38B, and a second protruding piece 38C. The first protruding piece 38B protrudes from the first base portion 38A toward the upstream Y1 side in the transport direction Y. The second protruding piece 38C protrudes from the first base portion 38A toward the downstream Y2 side in the transport direction Y. The engaging portion 38 has an inverted letter-T shape when viewed from the side in the width direction X. The second protruding piece 38C includes a protrusion-side tapered surface 38D sloped so as to approach the holding unit 37 toward the downstream Y2 side in the transport direction Y.

As illustrated in FIGS. 3 and 4, the holding unit 37 includes a pair of through holes 37C. The pair of through holes 37C are provided at an end portion of the holding unit 37 at the downstream Y2 side in the transport direction Y. The pair of through holes 37C are provided side by side in the width direction X. The pair of through holes 37C are provided so as to extend in the transport direction Y. The pair of through holes 37C penetrate through the holding unit 37 in a plate thickness direction.

The switching mechanism 40 includes a contact portion 43. The contact portion 43 includes a first contacting member 44 and a second contacting member 45. The first contacting member 44 and the second contacting member 45 are provided side by side in the width direction X. The first contacting member 44 and the second contacting member 45 are a pair of contacting members symmetrical with respect to the center, in the width direction X, of the switching mechanism 40. Hereinafter, mainly, the first contacting member 44 will be described as a representative, and the second contacting member 45 will not be described in some cases. In addition, in FIGS. 4, 6, and 8, reference characters corresponding to the first contacting member 44 and the second contacting member 45 are attached.

The first contacting member 44 protrudes from the case 41 toward the downward side Z2 in the vertical direction Z. The first contacting member 44 is inserted into the through hole 37C. The first contacting member 44 protrudes from the lower surface 37A of the holding unit 37 through the through hole 37C.

The first contacting member 44 switches between a contacting position and a separating position in association with movement of the operation portion 42. The contacting position is a position where the holding unit 37 is fixed to the medium support portion 30. The separating position is a position where the holding unit 37 is not fixed to the medium support portion 30. The separating position includes a first separating position and a second separating position.

The contacting position is a position where the first contacting member 44 is disposed when the medium holding unit 34 is in the first state. The first retracting position is a position where the first contacting member 44 is disposed when the medium holding unit 34 is in the second state. The second retracting position is a position where the first contacting member 44 is disposed when the medium holding unit 34 is in the third state.

The first contacting member 44 includes a main body portion 44A and a rotary shaft 44B. The main body portion 44A is disposed at the lower end of the rotary shaft 44B. The main body portion 44A is disposed at the downward side Z2, in the vertical direction Z, of the lower surface 37A of the holding unit 37. The main body portion 44A is disposed between the third inner-side surface 33B and the fourth inner-side surface 33C of the second guide rail 33.

The dimension of the main body portion 44A in the longitudinal direction is the length L. The length L is longer than a distance D between the third inner-side surface 33B and the fourth inner-side surface 33C along the transport direction Y. In other words, the dimension of the first contacting member 44 in the longitudinal direction is longer than the distance D between the third inner-side surface 33B and the fourth inner-side surface 33C in the transport direction Y.

The main body portion 44A includes a first end portion 44C, a second end portion 44D, a first side surface 44E, and a second side surface 44F. The first end portion 44C is an end portion of the main body portion 44A that is closer to the rotary shaft 44B among both end portions of the main body portion 44A in the longitudinal direction. The second end portion 44D is an end portion of the main body portion 44A that is farther from the rotary shaft 44B among both end portions of the main body portion 44A in the longitudinal direction. The top end of the first end portion 44C that extends toward the longitudinal direction of the main body portion 44A has an arc shape. The top end of the second end portion 44D that extends toward the longitudinal direction of the main body portion 44A has an arc shape.

The first side surface 44E is a surface including the longitudinal direction of the main body portion 44A and the vertical direction Z. The first side surface 44E is a surface configured to connect the first end portion 44C and the second end portion 44D. The second side surface 44F is a surface including the longitudinal direction of the main body portion 44A and the vertical direction Z. The second side surface 44F is a surface configured to connect the first end portion 44C and the second end portion 44D.

The first side surface 44E includes a magnet. In other words, the first side surface 44E may be a magnet. The first side surface 44E corresponds to one example of a contacting surface. On the other hand, the fourth inner-side surface 33C may be a ferromagnet. With this configuration, magnetic force occurs between the first side surface 44E and the fourth inner-side surface 33C.

The main body portion 44A includes a connecting portion 44G. The connecting portion 44G is disposed at a position closer to the second end portion 44D than the center of the main body portion 44A in the transport direction Y. In other words, when the first contacting member 44 is located at the contacting position, the connecting portion 44G is disposed at a position closer to the fourth inner-side surface 33C with the center of the first contacting member 44 in the longitudinal direction being the reference. The connecting portion 44G is able to couple the end portion of an elastic member 46 that will be described later. In other words, the connecting portion 44G corresponds to one example of an action portion where elastic force of the elastic member 46 acts.

The rotary shaft 44B is disposed at a position closer to the first end portion 44C than the center of the main body portion 44A in the transport direction Y. In other words, when the first contacting member 44 is located at the contacting position, the rotary shaft 44B is disposed at a position closer to the third inner-side surface 33B with the center of the first contacting member 44 in the longitudinal direction being the reference. The rotary shaft 44B is rotatably connected to the operation portion 42 through the through hole 37C of the holding unit 37. In this manner, the first contacting member 44 is connected to the operation portion 42, and hence, is linked to the movement of the operation portion 42. The rotary shaft 44B corresponds to one example of a base portion coupled to the operation portion 42.

The switching mechanism 40 includes the elastic member 46. The elastic member 46 may be a coil spring. The elastic member 46 has one end coupled to the connecting portion 44G of the first contacting member 44 and also has the other end coupled to the connecting portion 45G of the second contacting member 45. In other words, the elastic member 46 couples the first contacting member 44 and the second contacting member 45 in the width direction X between the first contacting member 44 and the second contacting member 45. The elastic member 46 causes elastic force to act in a direction in which the first contacting member 44 and the second contacting member 45 move close to each other. Note that, in the present embodiment, the first contacting member 44 and the second contacting member 45 include an accommodation portion, which is not illustrated, configured to accommodate the elastic member 46. With this configuration, the elastic member 46 is provided so as not to be brought into contact with the inner wall of the second guide rail 33.

In this manner, the first contacting member 44 and the second contacting member 45 are coupled to each other with the elastic member 46. Thus, when the first contacting member 44 and the second contacting member 45 are disposed at the contacting position, the first contacting member 44 and the second contacting member 45 are in contact with the third inner-side surface 33B and the fourth inner-side surface 33C in a state of pressing the third inner-side surface 33B and the fourth inner-side surface 33C with the elastic force of the elastic member 46.

Specifically, when the first contacting member 44 is disposed at the contacting position, the first end portion 44C is in contact with the third inner-side surface 33B. When the first contacting member 44 is disposed at the contacting position, the second end portion 44D is in contact with the fourth inner-side surface 33C. The second end portion 44D corresponds to one example of a contacting end portion.

In addition, when the first contacting member 44 and the second contacting member 45 are disposed at the contacting position, the distance, in the width direction X, between the first contacting member 44 and the second contacting member 45 increases toward the fourth inner-side surface 33C. In other words, when the operation portion 42 is located at the first position, the first contacting member 44 and the second contacting member 45 spread from the third inner-side surface 33B toward the fourth inner-side surface 33C.

The case 41 is disposed at the upward side Z1 of the upper surface 37B of the holding unit 37 in the vertical direction Z. The case 41 is attached to the upper surface 37B of the holding unit 37. The case 41 accommodates at least a portion of the operation portion 42.

The operation portion 42 is disposed at the upward side Z1 of the upper surface 37B of the holding unit 37 in the vertical direction Z. At least a portion of the operation portion 42 is accommodated in the case 41. The operation portion 42 is able to move in a direction along the transport direction Y.

The operation portion 42 includes a pair of support portions 42B. The pair of support portions 42B are provided side by side in the width direction X. The pair of support portions 42B are symmetric with the center of the switching mechanism 40 in the width direction X being the reference. The pair of support portions 42B are each provided at a position closer to a surface 42C that is an opposite from the operation surface 42A in the transport direction Y.

The pair of support portions 42B each include an insertion hole that allows the rotary shaft 44B of the first contacting member 44 and the rotary shaft 45B of the second contacting member 45 to be inserted. The pair of support portions 42B each rotatably support the rotary shaft 44B of the first contacting member 44 and the rotary shaft 45B of the second contacting member 45.

The operation portion 42 is able to move between the first position and the second position in a direction along the transport direction Y. With this configuration, the contact portion 43 moves in synchronization with the movement of the operation portion 42.

When the medium holding unit 34 is in the first state, the operation portion 42 is disposed at the first position. When the operation portion 42 is disposed at the first position, the contact portion 43 receives elastic force from the elastic member 46, and is located at the contacting position. That is, when the medium holding unit 34 is in the first state, the contact portion 43 is located at the contacting position.

As illustrated in FIGS. 5 and 6, when the medium holding unit 34 is in the second state in response to the pressing operation by a user, the operation portion 42 is located at the second position. The second position is a position closer to the fourth inner-side surface 33C than the first position. When the operation portion 42 is located at the second position, the contact portion 43 resists the elastic force by the elastic member 46 with the pressing force occurring in response to the pressing operation by a user, thereby being located at the first separating position. That is, when the medium holding unit 34 is in the second state, the contact portion 43 is located at the first separating position.

When the first contacting member 44 is located at the first separating position, the first end portion 44C is not in contact with the third inner-side surface 33B, and is spaced apart from the third inner-side surface 33B. When the first contacting member 44 is located at the first separating position, the second end portion 44D is in contact with the fourth inner-side surface 33C. In this manner, when each of the first contacting member 44 and the second contacting member 45 is located at the first separating position, these members are in contact with the fourth inner-side surface 33C, and are spaced apart from the third inner-side surface 33B. In addition, when each of the first contacting member 44 and the second contacting member 45 is located at the first separating position, these members are configured to spread from the third inner-side surface 33B toward the fourth inner-side surface 33C.

As illustrated in FIGS. 7 and 8, when the medium holding unit 34 is in the third state in response to the pressing operation by a user, the operation portion 42 is located at the second position, and the holding unit 37 itself moves to the downstream Y2 side in the transport direction Y. When the operation portion 42 is located at the second position and the holding unit 37 itself is located at the downstream Y2 side in the transport direction Y, the contact portion 43 resists the elastic force by the elastic member 46 with the pressing force acting in response to the pressing operation by the user, and is located at the second separating position. That is, when the medium holding unit 34 is in the third state, the contact portion 43 is located at the second separating position.

When the first contacting member 44 is located at the second separating position, the first end portion 44C is not in contact with the third inner-side surface 33B, and is spaced apart from the third inner-side surface 33B. When the first contacting member 44 is located at the second separating position, the second end portion 44D is not in contact with the fourth inner-side surface 33C whereas the first side surface 44E is in contact with the fourth inner-side surface 33C. In this manner, when each of the first contacting member 44 and the second contacting member 45 is located at the second separating position, these members are in contact with the fourth inner-side surface 33C and are spaced apart from the third inner-side surface 33B. In addition, the first contacting member 44 and the second contacting member 45 are each configured such that the longitudinal direction thereof is directed in the width direction X.

In addition, when the first contacting member 44 and the second contacting member 45 are located at the second separating position, the magnitude of the magnetic force acting between the first side surface 44E and the fourth inner-side surface 33C is smaller than the elastic force of the elastic member 46.

In this manner, the first contacting member 44 and the second contacting member 45 are able to move between the contacting position and the separating position. The contacting position is a position where these members are in contact with the third inner-side surface 33B and the fourth inner-side surface 33C in a state of pressing the third inner-side surface 33B and the fourth inner-side surface 33C. The separating position is a position where these members are in contact with the fourth inner-side surface 33C and are spaced apart from the third inner-side surface 33B.

Specifically, the first contacting member 44 and the second contacting member 45 move from the contacting position to the first separating position in synchronization with the movement of the operation portion 42 from the first position to the second position. The first contacting member 44 and the second contacting member 45 move from the contacting position to the second separating position in synchronization with the movement of the operation portion 42 from the first position to the second position and the movement of the holding unit 37 to the downstream Y2 side in the transport direction Y. Furthermore, the first contacting member 44 and the second contacting member 45 move from the first separating position and the second separating position to the contacting position in synchronization with the movement of the operation portion 42 from the second position to the first position.

Operation of First Embodiment

Operation of the First Embodiment Will be Described.

As illustrated in FIGS. 3 and 4, when the medium holding unit 34 is in the first state, the operation portion 42 is not operated by a user, and the operation portion 42 is located at the first position. In addition, with the elastic force of the elastic member 46, the first contacting member 44 and the second contacting member 45 are operated so as to be moved away from each other in the width direction X. With this operation, the contact portion 43 is located at the contacting position.

Specifically, at the first contacting member 44, the first end portion 44C is in contact with the third inner-side surface 33B, and the second end portion 44D is in contact with the fourth inner-side surface 33C. That is, the first contacting member 44 are in contact with the third inner-side surface 33B and the fourth inner-side surface 33C in a state of pressing the third inner-side surface 33B and the fourth inner-side surface 33C.

In addition, at the engaging portion 38, the first base portion 38A is in contact with the first inner-side surface 32B so as to press it toward the upstream Y1 side in the transport direction Y. At the engaging portion 38, the first protruding piece 38B is disposed inside the first recessed portion 32D, and the second protruding piece 38C is disposed outside the second recessed portion 32E. In other words, within the first guide rail 32, the engaging portion 38 is disposed upstream Y1 in the transport direction Y. As the first protruding piece 38B is disposed inside the first recessed portion 32D, it is possible to restrict coming-out of the engaging portion 38 from the first guide rail 32 toward the upward side Z1 in the vertical direction Z.

In this manner, when the medium holding unit 34 is in the first state, the engaging portion 38 engages with the first guide rail 32, and the first contacting member 44 and the second contacting member 45 are in contact with the second guide rail 33 so as to press the second guide rail 33. With this configuration, when the medium holding unit 34 is in the first state, the medium holding unit 34 is fixed to the medium support portion 30. In addition, in the medium holding unit 34, the holding unit 37 restricts the lifting of the end portion of the medium M. With this configuration, pressing force that presses toward the support face 31 occurs at the end portion of the medium M.

Next, as illustrated in FIGS. 5 and 6, when a pressing operation toward the downstream Y2 side in the transport direction Y is performed by a user to the operation surface 42A of the operation portion 42, the operation portion 42 resists the elastic force by the elastic member 46 with the pressing force acting in response to the pressing operation, and moves toward the downstream Y2 side in the transport direction Y. Then, the operation surface 42A of the operation portion 42 becomes flush with the upstream end surface 41A of the case 41. This brings the medium holding unit 34 into the second state, causes the operation portion 42 to be located at the second position, and causes the contact portion 43 to be located at the first separating position.

Specifically, in synchronization with the movement of the operation portion 42 from the first position to the second position, the first contacting member 44 resists the elastic force by the elastic member 46, and moves from the contacting position to the first separating position. In this case, the first contacting member 44 rotates with the rotary shaft 44B being the center in a state where the second end portion 44D is in contact with the fourth inner-side surface 33C. In addition, at the first contacting member 44, the first end portion 44C is spaced apart from the third inner-side surface 33B, and the second end portion 44D is in contact with the fourth inner-side surface 33C. Furthermore, at the first contacting member 44, the second end portion 44D has an arc shape, which allows the first contacting member 44 to smoothly rotate. In this manner, the first contacting member 44 is spaced apart from the third inner-side surface 33B, and is in contact with the fourth inner-side surface 33C in a state of pressing the fourth inner-side surface 33C due to the pressing force corresponding to the pressing operation to the operation portion 42 by a user. With this configuration, when the medium holding unit 34 is in the second state, the medium holding unit 34 is not fixed to the medium support portion 30. However, the medium holding unit 34 does not tilt relative to the direction along the transport direction Y due to the pressing force corresponding to the pressing operation by the user to the operation portion 42.

Next, as illustrated in FIGS. 7 and 8, after the operation portion 42 is located at the second position, the user further performs a pressing operation to the operation surface 42A of the operation portion 42 and the upstream end surface 41A of the case 41 toward the downstream Y2 side in the transport direction Y. In this case, due to the pressing force corresponding to the pressing operation, the medium holding unit 34 itself resists the elastic force by the elastic member 46, and moves toward the downstream Y2 side in the transport direction Y. This brings the medium holding unit 34 into the third state, causes the operation portion 42 to be located at the second position, and causes the contact portion 43 to be located at the second separating position.

Specifically, in synchronization with the movement of the medium holding unit 34 to the downstream Y2 side in the transport direction Y, the first contacting member 44 resists the elastic force by the elastic member 46, and moves from the first separating position to the second separating position. In this case, the first contacting member 44 rotates with the rotary shaft 44B being the center in a state where the second end portion 44D is in contact with the fourth inner-side surface 33C. In addition, at the first contacting member 44, the first end portion 44C and the second side surface 44F are spaced apart from the third inner-side surface 33B, and the second end portion 44D is spaced apart from the fourth inner-side surface 33C, while the first side surface 44E is in contact with the fourth inner-side surface 33C. Furthermore, at the first contacting member 44, magnetic force acts between the first side surface 44E and the fourth inner-side surface 33C, which makes it difficult to keep the state in which the first side surface 44E is in contact with the fourth inner-side surface 33C. In this manner, the first contacting member 44 is spaced apart from the third inner-side surface 33B, and is in contact with the fourth inner-side surface 33C in a state of pressing the fourth inner-side surface 33C due to the pressing force corresponding to the pressing operation by a user to the operation portion 42.

In addition, at the engaging portion 38, the first base portion 38A is in contact with the second inner-side surface 32C so as to press it to the downstream Y2 side in the transport direction Y in association with the movement of the medium holding unit 34 to the downstream Y2 side in the transport direction Y. At the engaging portion 38, the second protruding piece 38C is disposed inside the second recessed portion 32E, the protrusion-side tapered surface 38D is in contact with the guide-side tapered surface 32F, and the first protruding piece 38B is disposed outside the first recessed portion 32D. That is, within the first guide rail 32, the engaging portion 38 is disposed at the downstream Y2 side in the transport direction Y. As the second protruding piece 38C is disposed inside the second recessed portion 32E, it is possible to restrict coming-out of the engaging portion 38 from the first guide rail 32 toward the upward side Z1 in the vertical direction Z. Furthermore, as the protrusion-side tapered surface 38D is in contact with the guide-side tapered surface 32F, the medium holding unit 34 is guided so as to move along the width direction X.

With this configuration, when the medium holding unit 34 is in the third state, the medium holding unit 34 is not fixed to the medium support portion 30. In addition, the medium holding unit 34 is configured such that the contact portion 43 is in contact with the fourth inner-side surface 33C in a state of pressing the fourth inner-side surface 33C, and the engaging portion 38 is in contact with the second inner-side surface 32C and the guide-side tapered surface 32F. With this configuration, the medium holding unit 34 does not tilt relative to a direction along the transport direction Y. In particular, at the time of moving in the width direction X, the medium holding unit 34 does not tilt relative to the direction along the transport direction Y.

Furthermore, when the medium holding unit 34 is in the second state or the third state and the user stops operating the operation portion 42, the contact portion 43 moves to the contacting position due to the elastic force by the elastic member 46, and the operation portion 42 is located at the first position. Thus, the medium holding unit 34 does not tilt relative to a direction along the transport direction Y, is brought into the first state, and is fixed to the medium support portion 30.

Effects of First Embodiment

Effects of the First Embodiment Will be Described.

(1) In a typical medium supporting mechanism and a typical printing apparatus, the medium holding unit is configured so as to be in contact with the support face in order to hold an end portion of the medium in the width direction. In addition, when the medium holding unit is moved in the width direction, the medium holding unit may tilt from a direction along the transport direction due to a frictional force occurring between the medium holding unit and the support face.

In particular, it is also general that the medium holding unit has a shape curved along the transport direction so as to protrude toward the support face. In addition, the medium holding unit is configured so as to be in contact with the support face at the center thereof in the transport direction, and the area where this unit is in contact with the support face is narrow. Furthermore, in a typical printing apparatus, the size of the liquid discharging head in the transport direction of the medium tends to be long in order to improve the printing velocity. This necessitates an increase in the size of the medium holding unit in the transport direction of the medium. Such a case results in an increase in the distance between a position that is in contact with the support face and a position where operation is performed by the operation portion. This leads to an increase in a moment of a frictional force occurring between the medium holding unit and the support face when the medium holding unit is moved in the width direction. In such a situation, it is found that a phenomenon in which the medium holding unit tilts from a direction along the transport direction significantly occurs in a case where, at the time of moving the medium holding unit in the width direction, the medium holding unit is completely spaced apart from the guide rail at an end portion thereof where the operation portion is provided.

On the basis of such a technical background, in the present embodiment, the contact portion 43 is able to move between the contacting position and the separating position, the contacting position being a position where the contact portion 43 is in contact with the third inner-side surface 33B and the fourth inner-side surface 33C in a state of pressing the third inner-side surface 33B and the fourth inner-side surface 33C, the separating position being a position where the contact portion 43 is in contact with the fourth inner-side surface 33C and is spaced apart from the third inner-side surface 33B. The contact portion 43 moves from the contacting position to the separating position in synchronization with the movement of the operation portion 42 that can be operated by a user, from the first position to the second position. Thus, by moving the operation portion 42 from the first position to the second position, it is possible to move the holding unit 37 along the second guide rail 33 in a state where the contact portion 43 is in contact with the fourth inner-side surface 33C and the contact portion 43 is spaced apart from the third inner-side surface 33B. In particular, when the operation portion 42 moves in a direction from the third inner-side surface 33B toward the fourth inner-side surface 33C with the operation performed by a user, the external force applied to the operation portion 42 due to the operation by the user is a pressing force used for the contact portion 43 to press the fourth inner-side surface 33C. Thus, after the operation portion 42 moves in a direction from the third inner-side surface 33B toward the fourth inner-side surface 33C due to the operation by the user, it is possible to directly move the medium holding unit 34 along the second guide rail 33 in a state in which the contact portion 43 presses the fourth inner-side surface 33C. This makes it possible to move the holding unit 37 along the second guide rail 33. In this manner, even when a frictional force occurs between the holding unit 37 and the support face 31, the contact portion 43 that works in synchronization with the operation portion 42 is in contact with the fourth inner-side surface 33C, which makes it possible to prevent the holding unit 37 from tilting relative to the transport direction Y. This makes it possible to improve the operability.

(2) When the contact portion 43 is located at the contacting position, the contact portion 43 is in contact with the third inner-side surface 33B and the fourth inner-side surface 33C in a state of pressing the third inner-side surface 33B and the fourth inner-side surface 33C due to the elastic force of the elastic member 46. Thus, with a simplified configuration using the elastic member 46, it is possible to fix the medium holding unit 34 to the medium support portion 30 using the elastic force of the elastic member 46.

(3) The first contacting member 44 includes the first side surface 44E that is in contact with the fourth inner-side surface 33C when located at the second separating position. The first side surface 44E is a magnet, and the fourth inner-side surface 33C is a ferromagnet. In addition, when the contact portion 43 is located at the separating position, the magnitude of the magnetic force acting between the fourth inner-side surface 33C and the first side surface 44E is smaller than the elastic force of the elastic member 46. Thus, when the operation portion 42 is located at the second position, it is possible to easily keep the state in which the contact portion 43 is in contact with the fourth inner-side surface 33C, due to the magnetic force acting between the fourth inner-side surface 33C and the first side surface 44E. In addition to this, it is possible to make configuration such that, in a case where the operation to the operation portion 42 is stopped when the operation portion 42 is located at the second position, the operation portion 42 resists the magnetic force with the elastic force of the elastic member 46, and returns from the second position to the first position. This makes it possible to improve the operability.

(4) The length L, in the longitudinal direction, of each of the first contacting member 44 and the second contacting member 45 is longer than the distance D between the third inner-side surface 33B and the fourth inner-side surface 33C in the transport direction Y. In addition, when each of the first contacting member 44 and the second contacting member 45 is located at the contacting position, the first contacting member 44 and the second contacting member 45 are configured to spread in the width direction X from the third inner-side surface 33B toward the fourth inner-side surface 33C. Thus, by using, as the contact portion 43, the contacting member 44 and the second contacting member 45 having the length L in the longitudinal direction longer than the distance D, it is possible to fix the medium holding unit 34 to the medium support portion 30 with the elastic force of the elastic member 46.

In addition, a typical medium supporting mechanism is configured such that the first contacting member and the second contacting member are provided side by side in the width direction, and a user performs a setting knob operation in which the first contacting member and the second contacting member are pinched in the width direction. In such a case, the first contacting member and the second contacting member are each moved in response to the setting knob operation by the user, which enables the holding unit to move along the guide rail. In a case of such a typical configuration, it is not easy to keep a balance between the external force applied to the first contacting member and the external force applied to the second contacting member, which causes the medium holding unit to tilt from a direction along the transport direction.

In contrast, the present embodiment is configured such that the operation portion 42 moves from the third inner-side surface 33B to the fourth inner-side surface 33C with the pressing operation by a user, whereby the first contacting member 44 and the second contacting member 45 spread in the width direction X. Thus, it is easy to keep a balance between the external force applied to the first contacting member 44 and the external force applied to the second contacting member 45. This makes it possible to prevent the holding unit 37 from tilting relative to the transport direction Y, and it is possible to improve the operability.

(5) The first contacting member 44 includes the second end portion 44D that is brought into contact with the fourth inner-side surface 33C when the first contacting member 44 is located at the contacting position, and the second end portion 44D has an arc shape. Thus, it is possible to smoothly create a state in which the the contact portion 43 is in contact with the fourth inner-side surface 33C, and to improve the operability. Furthermore, it is possible to prevent a deterioration of the second end portion 44D due to wear.

(6) The operation portion 42 protrudes from the case 41 when located at the first position, and does not protrude from the case 41 when located at the second position. With this configuration, by operating the operation portion 42 such that the operation portion 42 does not protrude from the case 41, it is possible to move the contact portion 43 to the first separating position and the second separating position, which makes it possible to improve the operability.

Modification Examples

The present embodiment can be modified in the following manner. The present embodiment and the following modification examples may be implemented in combination within a range in which a technical contradiction does not arise.

- The first side surface 44E may be a ferromagnet, and the fourth inner-side surface 33C may include a magnet. In other words, it is preferable that either one of the first side surface 44E and the fourth inner-side surface 33C is a magnet and the other one is a ferromagnet.
- The case 41 may include a guide portion configured to guide movement of the operation portion 42 along the transport direction Y.
- The rotary shaft 44B may not be formed integrally with the first contacting member 44. The rotary shaft 44B may be formed integrally with the operation portion 42. The rotary shaft 44B may not be formed integrally with the operation portion 42 or the first contacting member 44. In other words, it is only necessary that the contact portion 43 moves in synchronization with the operation portion 42, and a power transmitting member may be provided between the operation portion 42 and the contact portion 43 or a force transmitting member may not be provided between them. In other words, it is only necessary that the contact portion 43 is synchronized with the movement of the operation portion 42 regardless of whether the contact portion 43 is directly connected to the operation portion 42 or is indirectly connected to the operation portion 42.
- The elastic member 46 may not be a coil spring as long as elastic force acts on the first contacting member 44 and the second contacting member 45.
- The elastic member 46 may separately include a first elastic member configured to cause elastic force to act on the first contacting member 44 and a second elastic member configured to cause elastic force to act on the second contacting member 45. In this case, the first elastic member is only necessary to be coupled to at least the first contacting member 44, and the first elastic member may be coupled to the second contacting member 45 or may be coupled to any member other than the second contacting member 45. The second elastic member is only necessary to be coupled to at least the second contacting member 45, and the second elastic member may be coupled to the first contacting member 44 or may be coupled to any member other than the first contacting member 44.
- In the first contacting member 44 and the second contacting member 45, the first side surfaces 44E and 45E each include a caster. With this configuration, the first side surfaces 44E and 45E move in a roll manner in a state of being in contact with the fourth inner-side surface 33C, which makes it easy to move the medium holding unit 34 in the width direction X.
- When the medium holding unit 34 is in the third state, the engaging portion 38 may not be in contact with the first inner-side surface 32B nor the second inner-side surface 32C. In this case, the first guide rail 32 may be configured not to include the second inner-side surface 32C. In other words, the engaging portion 38 is only necessary to be able to engage with the first inner-side surface 32B when the medium holding unit 34 is in the first state and the second state.
- The engaging portion 38 may not be configured to extend in the width direction X. In this case, the engaging portion 38 is only necessary to be able to engage with the first guide rail 32 when the medium holding unit 34 is in the first state and the second state, and it is preferable that the engaging portion 38 includes one or a plurality of surfaces along the width direction X. In addition, it is preferable that, when the medium holding unit 34 is in the first state and the second state, the first guide rail 32 is in surface contact with the engaging portion 38.
- The contact portion 43 may be located at the first separating position when the medium holding unit 34 itself moves to the downstream Y2 side in the transport direction Y in response to the operation of the case 41 and the operation portion 42. In this case, the rotary shaft 44B may be located at an end portion of the through hole 37C. In other words, the contact portion 43 may be in surface contact with the fourth inner-side surface 33C or may be in point contact with the fourth inner-side surface 33C, as long as the contact portion 43 is in contact with the fourth inner-side surface 33C and the contact portion 43 is located at the separating position where the contact portion 43 is spaced apart from the third inner-side surface 33B.
- After the medium holding unit 34 turns into the second state from the first state in response to the pressing operation to the operation portion 42, the medium holding unit 34 turns into the third state from the second state in response to the pressing operation to the case 41 and the operation portion 42. However, the operation is not limited to this. For example, it may be possible to employ a configuration in which, in response to the pressing operation to the case 41 and the operation portion 42, the medium holding unit 34 turns into the third state from the first state without passing through the second state.
- As for the direction of operation to the operation portion 42, the operation portion 42 may be operated to the upstream Y1 in the transport direction Y. In this case, the upstream Y1 and the downstream Y2 in the transport direction Y may be swapped in terms of the functions of the engaging portion 38, the switching mechanism 40, the first guide rail 32, and the second guide rail 33. In other words, it may be possible to employ a configuration in which the first surface is disposed upstream Y1 in the transport direction Y and the second surface is disposed downstream Y2 in the transport direction Y or a configuration in which the first surface is disposed downstream Y2 in the transport direction Y and the second surface is disposed upstream Y1 in the transport direction Y. In this case, the fourth inner-side surface 33C serves as one example of the first surface and the third inner-side surface 33B serves as one example of the second surface.

The switching mechanism 40 may be provided upstream Y1 of the holding unit 37 in the transport direction Y. In this case, the arrangement of the first guide rail 32 and the arrangement of the second guide rail 33 may be swapped. In addition, the engaging portion 38 may be provided downstream Y2 of the holding unit 37 in the transport direction Y.

The contact portion 43 may not include a pair of contacting members or may include one or three or more contacting members.

The embodiment described above employs a serial type printer as the printing apparatus 10. However, the printing apparatus 10 is not limited to this, and it may be possible to employ any scanning-type printing apparatus configured to move the carriage 19 that includes the liquid discharging head 21 mounted thereon. For example, it may be possible to employ a lateral type printer as the printing apparatus 10. The lateral type printer is a printer in which the carriage 19 is able to move in two directions of the main scanning direction and the sub scanning direction.

The printing apparatus 10 is not limited to the ink jet-type printer, and may be a dot impact-type printer.

The printing type of the printing apparatus 10 may not be an ink jet type, and may be a laser type.

The medium M is not limited to a medium delivered from the roll body R. The medium M may be a sheet, a film made of resin, a complex film including resin and metal, a laminate film, woven fabric, nonwoven fabric, a metal foil, a metal film, a ceramic sheet, or the like. In addition, the medium M may be a towel, or clothing such as a shirt.

The printing apparatus 10 is not limited to a printer, and may be a multifunction device having a scanner function and a copying function in addition to a printing function.

Supplementary Note

Hereinafter, technical concepts and effects thereof that are understood from the above-described embodiments and modified examples will be described.

(A) A medium supporting mechanism includes: a medium support portion configured to support a medium transported in a transport direction; and a medium holding unit configured to hold an end portion, in a width direction, of the medium supported by the medium support portion, when the width direction represents a direction intersecting the transport direction, in which the medium support portion includes: a support face configured to support the medium transported in the transport direction; a guide groove extending along the width direction at the support face; and an engaged portion disposed upstream of the guide groove in the transport direction and intersecting the support face, the guide groove includes a first surface and a second surface, the first surface and the second surface constitute inner walls of the guide groove that extends in the width direction, and are opposed to each other in the transport direction, the medium holding unit includes: a holding unit configured to hold the end portion; an engaging portion configured to engage with the engaged portion; a contact portion configured to move between a contacting position where the contact portion is in contact with the first surface and the second surface in a state of pressing the first surface and the second surface and a separating position where the contact portion is in contact with the second surface and is spaced apart from the first surface; and an operation portion configured to, when operated by a user, move in a direction from one of the first surface and the second surface toward the other surface relative to the holding unit, and the contact portion moves from the contacting position to the separating position in association with movement of the operation portion in a direction from the first surface toward the second surface.

With this configuration, by moving the operation portion in a direction from the first surface toward the second surface, it is possible to change the state into a state in which the contact portion is in contact with the second surface and is spaced apart from the first surface. This makes it possible to move the holding unit along the guide groove in a state where the contact portion is in contact with the second surface when the operation portion moves in a direction from the first surface toward the second surface due to the operation by a user. In this manner, even when a frictional force occurs between the holding unit and the support face, the contact portion working in synchronization with the operation portion is in contact with the second surface, which makes it possible to prevent the holding unit from tilting relative to the transport direction. This makes it possible to improve the operability.

(B) It may be possible to employ a configuration in which the medium holding unit includes an elastic member, the contact portion is coupled with the elastic member, and when located at the contacting position, the contact portion is in contact with the first surface and the second surface in a state of pressing the first surface and the second surface with elastic force of the elastic member.

This configuration makes it possible to fix the medium holding unit to the medium support portion with the elastic force with a simplified configuration using the elastic member.

(C) It may be possible to employ a configuration in which the contact portion includes a contacting surface configured to be in contact with the second surface when the contact portion is located at the separating position, either one of the second surface and the contacting surface is a magnet, the other one of the second surface and the contacting surface is a ferromagnet, and when the contact portion is located at the separating position, a magnitude of magnetic force acting between the second surface and the contacting surface is smaller than elastic force of the elastic member.

With this configuration, when the operation portion is located at the second position, it is possible to easily keep the state in which the contact portion is in contact with the second surface with the magnetic force acting between the second surface and the contacting surface. In addition to this, in a case where the operation to the operation portion is stopped when the operation portion is located at the second position, it is possible to employ a configuration in which the operation portion resists the magnetic force with the elastic force of the elastic member, and returns from the second position to the first position. This makes it possible to improve the operability.

(D) It may be possible to employ a configuration in which the contact portion includes a pair of contacting members, each of the pair of contacting members includes a base portion coupled to the operation portion, and an action portion coupled to the elastic member, a dimension of each of the pair of contacting members in a longitudinal direction is longer than a distance between the first surface and the second surface in the transport direction, and each of the pair of contacting members is configured such that the base portion is disposed at a position closer to the first surface with respect to a center in a longitudinal direction of the contacting member when the contacting member is located at the contacting position, the action portion is disposed at a position closer to the second surface with the center in a longitudinal direction of the contacting member when the contacting member is located at the contacting position, and when the contacting member is located at the contacting position, the contacting member spreads in the width direction from the first surface toward the second surface.

With this configuration, by using, as the contact portion, the pair of contacting members having the dimension in the longitudinal direction longer than the distance between the first surface and the second surface in the transport direction, it is possible to fix the medium holding unit to the medium support portion with the elastic force of the elastic member. In addition, this makes it easy to keep the balance of external force applied to the pair of contacting members. Thus, it is possible to prevent the holding unit from tilting relative to the transport direction, which makes it possible to improve the operability.

(E) It may be possible to employ a configuration in which the contact portion includes a contacting end portion configured to be in contact with the second surface when the contact portion is located at the contacting position, and the contacting end portion has an arc shape.

With this configuration, it is possible to smoothly create a state in which the contact portion is in contact with the second surface, which makes it possible to improve the operability. Thus, it is possible to prevent a deterioration of the contacting end portion due to wear.

(F) It may be possible to employ a configuration in which the medium holding unit includes a case, the operation portion is configured to move between a first position and a second position closer to the second surface than the first position, and the operation portion protrudes from the case when located at the first position and does not protrude from the case when located at the second position.

With this configuration, by operating the operation portion such that the operation portion does not protrude from the case, it is possible to move the contact portion to the separating position, which makes it possible to improve the operability.

(G) A printing apparatus includes: a medium support portion configured to support a medium transported in a transport direction; a medium holding unit configured to hold an end portion, in a width direction, of the medium supported by the medium support portion, when the width direction represents a direction intersecting the transport direction; and a printing unit configured to perform printing on the medium supported by the medium support portion, in which the medium support portion includes: a support face configured to support the medium transported in the transport direction; a guide groove extending along the width direction at the support face; and an engaged portion disposed upstream of the guide groove in the transport direction and intersecting the support face, the guide groove includes a first surface and a second surface, the first surface and the second surface constitute inner walls of the guide groove that extends in the width direction, and are opposed to each other in the transport direction, the medium holding unit includes: a holding unit configured to hold the end portion; an engaging portion configured to engage with the engaged portion; a contact portion configured to move between a contacting position where the contact portion is in contact with the first surface and the second surface in a state of pressing the first surface and the second surface and a separating position where the contact portion is in contact with the second surface and is spaced apart from the first surface; and an operation portion configured to, when operated by a user, move in a direction from one of the first surface and the second surface toward the other surface relative to the holding unit, and the contact portion moves from the contacting position to the separating position in association with movement of the operation portion in a direction from the first surface toward the second surface. This configuration provides the same effect as (A).

(H) A medium supporting mechanism includes: a medium support portion configured to support a medium transported in a transport direction; and a medium holding unit configured to hold an end portion, in a width direction, of the medium supported by the medium support portion, when the width direction represents a direction intersecting the transport direction, in which the medium support portion includes: a support face configured to support the medium transported in the transport direction; a guide groove extending along the width direction at the support face; and an engaged portion intersecting the support face, the guide groove includes a first surface and a second surface, the first surface and the second surface constitute inner walls of the guide groove that extends in the width direction, and are opposed to each other in the transport direction, the medium holding unit includes: a holding unit configured to hold the end portion; an engaging portion configured to engage with the engaged portion; a contact portion configured to move between a contacting position where the contact portion is in contact with the first surface and the second surface in a state of pressing the first surface and the second surface and a separating position where the contact portion is in contact with the second surface and is spaced apart from the first surface; and an operation portion configured to, when operated by a user, move in a direction from one of the first surface and the second surface toward the other surface relative to the holding unit, and the contact portion moves from the contacting position to the separating position in association with movement of the operation portion in a direction from the first surface toward the second surface. This configuration provides the same effect as (A).

What is claimed is:

1. A medium supporting mechanism comprising:

a medium support portion configured to support a medium transported in a transport direction; and a medium holding unit configured to hold an end portion, in a width direction, of the medium supported by the medium support portion, when the width direction represents a direction intersecting the transport direction, wherein the medium support portion includes:

a support face configured to support the medium transported in the transport direction;

a guide groove extending along the width direction at the support face; and an engaged portion disposed upstream of the guide groove in the transport direction and intersecting the support face, the guide groove includes a first surface and a second surface, the first surface and the second surface constitute inner walls of the guide groove that extends in the width direction, and are opposed to each other in the transport direction, the medium holding unit includes:

a holding unit configured to hold the end portion;

an engaging portion configured to engage with the engaged portion;

a contact portion configured to move between a contacting position where the contact portion is in contact with the first surface and the second surface in a state of pressing the first surface and the second surface and a separating position where the contact portion is in contact with the second surface and is spaced apart from the first surface; and an operation portion configured to, when operated by a user, move in a direction from one of the first surface and the second surface toward the other surface relative to the holding unit, and the contact portion moves from the contacting position to the separating position in association with movement of the operation portion in a direction from the first surface toward the second surface.

2. The medium supporting mechanism according to claim 1, wherein the medium holding unit includes an elastic member, the contact portion is coupled with the elastic member, and when located at the contacting position, the contact portion is in contact with the first surface and the second surface in a state of pressing the first surface and the second surface with elastic force of the elastic member.

3. The medium supporting mechanism according to claim 2, wherein the contact portion includes a contacting surface configured to be in contact with the second surface when the contact portion is located at the separating position, either one of the second surface and the contacting surface is a magnet, the other one of the second surface and the contacting surface is a ferromagnet, and when the contact portion is located at the separating position, a magnitude of magnetic force acting between the second surface and the contacting surface is smaller than elastic force of the elastic member.

4. The medium supporting mechanism according to claim 2, wherein the contact portion includes a pair of contacting members, each of the pair of contacting members includes a base portion coupled to the operation portion, and an action portion coupled to the elastic member, a dimension of each of the pair of contacting members in a longitudinal direction is longer than a distance between the first surface and the second surface in the transport direction, and each of the pair of contacting members is configured such that the base portion is disposed at a position closer to the first surface with respect to a center in a longitudinal direction of the contacting member when the contacting member is located at the contacting position, the action portion is disposed at a position closer to the second surface with respect to a center in a longitudinal direction of the contacting member when the contacting member is located at the contacting position, and when the contacting member is located at the contacting position, the contacting member spreads in the width direction from the first surface toward the second surface.

5. The medium supporting mechanism according to claim 1, wherein the contact portion includes a contacting end portion configured to be in contact with the second surface when the contact portion is located at the contacting position, and the contacting end portion has an arc shape.

6. The medium supporting mechanism according to claim 1, wherein the medium holding unit includes a case, the operation portion is configured to move between a first position and a second position closer to the second surface than the first position, and the operation portion protrudes from the case when located at the first position, and does not protrude from the case when located at the second position.

7. A printing apparatus comprising:

a medium support portion configured to support a medium transported in a transport direction;

a medium holding unit configured to hold an end portion, in a width direction, of the medium supported by the medium support portion, when the width direction represents a direction intersecting the transport direction; and a printing unit configured to perform printing on the medium supported by the medium support portion, wherein the medium support portion includes:

a support face configured to support the medium transported in the transport direction;

a guide groove extending along the width direction at the support face; and an engaged portion disposed upstream of the guide groove in the transport direction and intersecting the support face, the guide groove includes a first surface and a second surface, the first surface and the second surface constitute inner walls of the guide groove that extends in the width direction, and are opposed to each other in the transport direction, the medium holding unit includes:

a holding unit configured to hold the end portion;

an engaging portion configured to engage with the engaged portion;

a contact portion configured to move between a contacting position where the contact portion is in contact with the first surface and the second surface in a state of pressing the first surface and the second surface and a separating position where the contact portion is in contact with the second surface and is spaced apart from the first surface; and an operation portion configured to, when operated by a user, move in a direction from one of the first surface and the second surface toward the other surface relative to the holding unit, and the contact portion moves from the contacting position to the separating position in association with movement of the operation portion in a direction from the first surface toward the second surface.

* * * * *